United States Patent
Schwartz et al.

(10) Patent No.: US 8,964,616 B2
(45) Date of Patent: Feb. 24, 2015

(54) SYSTEM AND METHOD FOR SCHEDULING CELL BROADCAST MESSAGE

(75) Inventors: Zarick Schwartz, Mountain Lakes, NJ (US); Huy Thang Pham, Dollard-des-Ormeaux (CA)

(73) Assignee: Alcatel Lucent, Boulogne-Billancourt (FR)

( * ) Notice: Subject to any disclaimer, the term of this patent is extended or adjusted under 35 U.S.C. 154(b) by 195 days.

(21) Appl. No.: 13/617,423

(22) Filed: Sep. 14, 2012

(65) Prior Publication Data

US 2014/0078945 A1    Mar. 20, 2014

(51) Int. Cl.
*H04W 52/02* (2009.01)
*H04W 72/12* (2009.01)

(52) U.S. Cl.
CPC ...... *H04W 52/0216* (2013.01); *H04W 72/1289* (2013.01)
USPC .......................................... 370/311; 370/328

(58) Field of Classification Search
CPC ............ H04W 52/0216; H04W 52/02; H04W 72/005; H04W 72/1289
USPC .......................... 370/311, 328, 329, 468, 476
See application file for complete search history.

(56) References Cited

U.S. PATENT DOCUMENTS

| | | | |
|---|---|---|---|
| 7,747,235 B2 * | 6/2010 | Lee et al. | 455/154.1 |
| 2004/0105402 A1 * | 6/2004 | Yi et al. | 370/312 |
| 2004/0219919 A1 | 11/2004 | Whinnett et al. | |
| 2005/0083961 A1 * | 4/2005 | Pecen et al. | 370/432 |
| 2005/0237972 A1 * | 10/2005 | Van Dervelde et al. | 370/329 |
| 2011/0003600 A2 * | 1/2011 | Beckmann et al. | 455/455 |
| 2011/0081928 A1 | 4/2011 | Chen et al. | |
| 2011/0201365 A1 * | 8/2011 | Segura | 455/466 |
| 2012/0051226 A1 * | 3/2012 | Cai | 370/241 |
| 2013/0176951 A1 * | 7/2013 | Dhanda et al. | 370/329 |
| 2013/0295943 A1 * | 11/2013 | Pasumarthi et al. | 455/450 |

* cited by examiner

*Primary Examiner* — Min Jung
(74) *Attorney, Agent, or Firm* — Wall & Tong, LLP (57) ABSTRACT

A system, method and apparatus allocating reserved space for discontinuous reception (DRX) schedule period schedule messages (SM) to accommodate scheduling information for messages already received as well as messages expected to be received prior to transmitting the SM to user equipment.

20 Claims, 6 Drawing Sheets

SYSTEM AND METHOD FOR SCHEDULING CELL BROADCAST MESSAGE

FIELD OF THE INVENTION

The invention relates generally to communication networks and, more specifically but not exclusively, to improving radio network throughput.

BACKGROUND

Discontinuous Reception (DRX) is the periodic switching off of a receiver, usually to save energy. DRX cycles can be configured in the LTE downlink so that user equipment (UE) does not have to decode the Physical Downlink Control CHannel (PDCCH) or receive Physical Downlink Shared CHannel (PDSCH) transmissions in certain subframes. UE in a cell forward access channel (Cell_FACH) may implement discontinuous reception (DRX) when receiving data from a radio network controller (RNC) via a high speed downlink shared channel (HS-DSCH). See, e.g., 3GPP TS36.321 Section 5.7 for connected mode, and TS36.304 Section 7.1 for idle mode.

Generally speaking, each of a sequence of core network (CN) broadcast periods has associated with it a respective DRX schedule period during which a scheduling message (SM) may be transmitted by the RNC to the UE to schedule thereby transmission of cell broadcast (CB) messages from the RNC to the UE during a DRX schedule period of an upcoming CN broadcast period. The SM typically occupies a fixed number (e.g., 40) of Common Traffic Channel (CTCH) block sets within the DRX schedule period.

SUMMARY

Various deficiencies in the prior art are addressed by systems, methods and apparatus for allocating reserved space for schedule messages (SM) to accommodate scheduling information for messages already received as well as messages expected to be received prior to transmitting the SM to user equipment (UE) from, e.g., a radio network controller (RNC). In this manner, UE connection time may be reduced and discontinuous reception (DRX) schedule periods may be more efficiently utilized.

One embodiment comprises a method for scheduling transmission of cell broadcast (CB) messages to user equipment (UE) from a radio network controller (RNC), comprising: transmitting toward a UE a scheduling message (SM) and any scheduled cell broadcast (CB) messages during each (n) of a plurality of discontinuous reception (DRX) schedule periods, wherein the SM includes scheduling information for CB messages to be transmitted to the UE during a subsequent DRX schedule period; the SM being adapted to have a size sufficient to store scheduling information for one of an expected number and a maximum number of CB messages to be received prior to a next DRX schedule period.

BRIEF DESCRIPTION OF THE DRAWINGS

The teachings herein can be readily understood by considering the following detailed description in conjunction with the accompanying drawings, in which:

FIG. 6 depicts a high-level block diagram of a computer suitable for use in performing the functions described herein.

To facilitate understanding, identical reference numerals have been used, where possible, to designate identical elements that are common to the figures.

DETAILED DESCRIPTION

While primarily discussed within the context of networks such as Universal Mobile Telecommunications System (UMTS) networks, Long Term Evolution (LTE) networks and the like, those skilled in the art and informed by the teachings herein will realize that the invention is also well suited for use with other types of wireless networks (e.g., 3G networks, 2G networks, WiMAX and so on). Where adapted to implement discontinuous reception. Thus, the various connectors, sites, nodes, network elements and so on discussed herein with respect to LTE embodiments may also be considered as being discussed with respect to similar elements in other network embodiments (e.g., eNodeB in LTE or 4G network being similar to Base Station in 3G or UMTS network, etc.).

Thus in the following description the term "UE" is intended to refer to any suitable wireless communication device, the term "eNodeB" is intended to refer to any base transceiver station, and the term "RNC" is intended to refer to any radio network controller, such as a base station controller. In addition, control signals and data described herein as being sent between the UE and the node B on specific channels appropriate to a WCDMA system compatible with 3GPP specifications may in other embodiments of the invention be sent on any suitable control and data channels available in other communication systems.

Part of the invention lies in the inventors' recognition that the existing discontinuous scheduling mechanism causes unnecessary depletion and reduction of UE battery life cycle. In particular, the maximum length of Scheduling Message is typically fixed (e.g., hardcoded to 40 or some other fixed number) and therefore dictates the total number of CTCH Block Sets that have to be reserved for the Scheduling Message, without considering resource constraints on the RNC and UE. This in turn causes the UE to invoke the RRC layer to start reception of all 40 CTCH Block Sets despite that many of these may not contain any scheduling data whatsoever, thereby unnecessarily reducing UE battery life.

Figure 1:
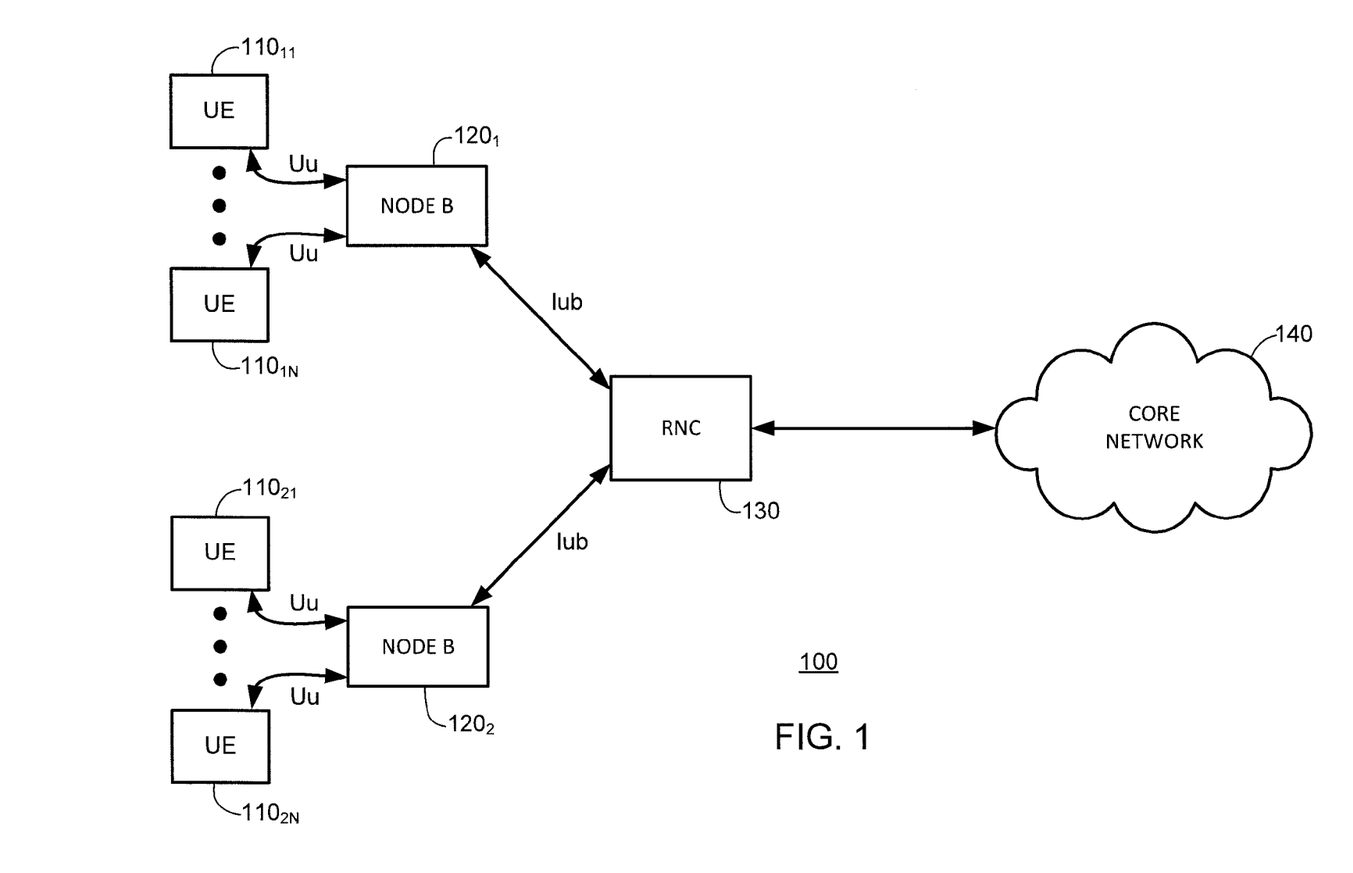
FIG. 1 depicts an exemplary wireless communication system supporting various embodiments.

FIG. 1 depicts a high-level block diagram of an exemplary network portion benefiting from the present embodiments. Specifically, FIG. 1 depicts a network portion 100 comprising a first plurality of user elements (UEs) $110_{11}$ $110_{1N}$ in radio communication with a first eNodeB $120_1$ via respective Uu interfaces, and a second plurality of user elements (UEs) $110_{21}$ $110_{2N}$ in radio communication with a second eNodeB $120_2$ via respective Uu interfaces. The first and second eNodeBs 120 are in communication with a radio network controller (RNC) 130 via respective Iub interfaces. The RNC 130 is in communication with core network elements 140.

The UEs 110 are wireless user devices capable of accessing a wireless network. The UEs are capable of supporting control signaling in support of the bearer session(s). The UEs may be a phone, PDA, computer, or any other wireless user device.

Figure 2:
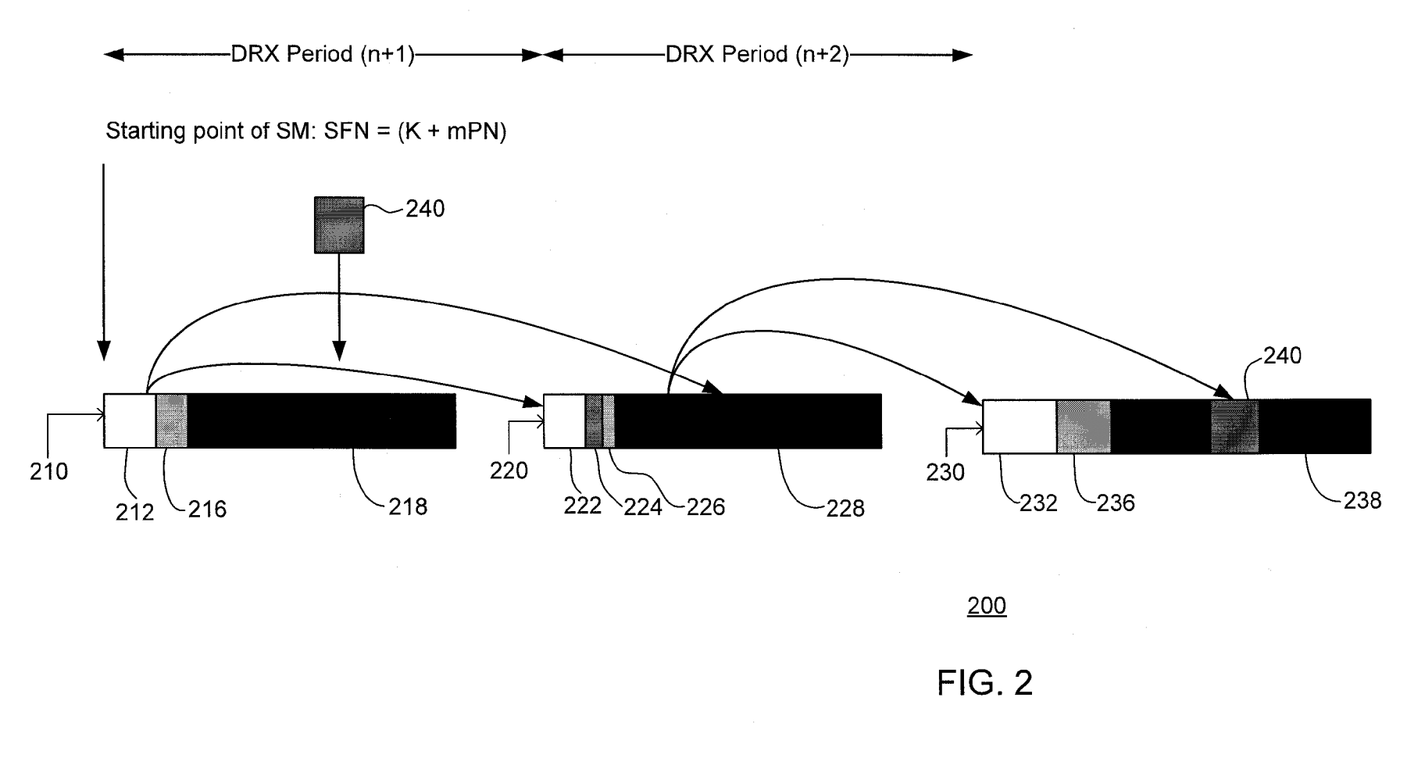
FIG. 2 depicts a timing diagram illustrating information flow between a radio network controller and user equipment according to an embodiment.

Information flow between a radio network controller (RNC) and user equipment (UE) occurs during each of a sequence of core network (CN) broadcast periods, illustratively CNn, CNn+1, CNn+2 and CNn+3. Each core network broadcast period is offset from its respective DRX schedule period by amount of time expected to be needed to build a schedule message (SM) for messages received in a prior core network broadcast period. The DRX Schedule Period is different from the CBS Schedule Period (which can be variable and is sent as part of the message structure). The SM is broadcast at the beginning of DRX Schedule Period, which does not need to coincide with the beginning of the CBS schedule period. A Cell Broadcast Schedule (CBS) period is a finite sequence of CTCH block sets of variable length in which a schedule message (SM) and scheduled CB messages are broadcast.

In operation, the RNC transmits a SM to the UE during a first DRX schedule period (i.e., as a first message within the corresponding CBS schedule period) to schedule later transmission of cell broadcast (CB) messages from the RNC to the UE. For example, assume that SM(n) is the Schedule Message sent in DRX Schedule period n. The Schedule Message schedules transmission of the CB messages in the next DRX period (period n+1). In order to accomplish this, the CB messages have to be received by the scheduler during Core Network Broadcast period n, prior to the end of the sending of the SM(n) in the DRX period n since the SM(n) is sent at the beginning of DRX Schedule Period n.

Various embodiments operate to dynamically adjust the size of the Schedule Message in response to the amount of data that should be re-transmitted in the next CBS Schedule Period.

Various embodiments provide a parameter specifying an optimum number of CTCH BS that could be occupied by the new CB messages that may arrive in a single DRX Schedule period and have to be scheduled by the next Schedule Message. This parameter may reflect an optimal bandwidth associated with the CB messages that arrives to RNC. This parameter will be used for calculating Schedule Message Reserved Space (in CTCH BS) that should be pre-allocated to accommodate scheduling of these messages. The Schedule Message Reserved Space is pre-allocated in the Schedule Message on top of existing number of CTCH BS allocated to accommodate scheduling of previously received messages. The DRX schedule period will provide upper limit for the size of the schedule message because it is not possible to schedule more than what fits into a single DRX schedule period.

In various embodiments, the number of CTCH BS that could be occupied by the new CB messages that may arrive in a single DRX Schedule period may be calculated or deterministically derived using, for example, optimal, actual, projected or expected message channel bandwidth, data rate or message rate, the amount of time remaining in the current channel period within which messages may be received, and/or other factors discussed herein. Various statistical analysis techniques may be employed to analyze message or data flow such as an extrapolation based upon the expected arrival rate of some number of CB messages along with CB message size information.

In various embodiments, the order between the Schedule Message and CB messages is reversed. In these embodiments, the timing of the beginning of CBS schedule period is adjusted for every CBS schedule period. This may be achieved by adjusting the length of Offset to Begin CTCH BS index. These embodiments provide a shorter response for transmission of newly arrived CB messages when they are transmitted the first time, because the messages are transmitted prior to Schedule Message. The latency of improvement is the length of the CBS Schedule Period.

Generally speaking, a scheduling message (SM) data structure includes various fields for storing data used by receivers to identify the SM and/or CB message portions of the DRX Schedule period, which DRX Schedule period may itself be variable in length. Such data may include, illustratively, index or offset information such as described herein.

The "Offset to Begin CTCH BS Index" provides a pointer to the first CTCH BS of the next CBS Schedule period relative to the CTCH BS index of the first part of the current BMC Schedule message. The "Length of CBS Scheduling Period" provides the number of consecutive CTCH BS of the next CBS schedule period. Together with Offset to Begin CTCH BS Index, it points to the end of the CBS schedule period.

In various embodiments, a schedule message SM(n) contains a header and two components denoted herein as BMcomp(n) and SMcomp(n). The size of the header may be defined by a parameter SMHcount. For example, where SMHcount=3, one byte is used for each of the following header fields: Message Type IE, Offset to Begin CTCH BS Index IE, and length of CBS scheduling period IE.

The BMcomp(n) component includes information pertaining to the CTCH Block Sets that will be occupied by the CB messages transmitted in the DRX period n+1. This component includes the bitmaps of the New Message Bitmap IE and corresponding Message Description IEs for each bit, indicating which CTCH Block Sets will be occupied by CB messages and optionally CBS Schedule Message Extension.

The SMcomp(n) component includes information pertaining to the total number of CTCH Block Sets that are reserved for the next scheduling message SM(n+1). This component includes, illustratively, the bitmaps of a New Message Bitmap IE that are set to "1" and corresponding Message Description IEs set to "6", indicating that there will be SM(n+1) in the corresponding CTCH Block Sets.

In addition to the above, other parameters related to and/or useful in understanding the various embodiments include the following:

RLCpayloadSize defines a RLC level message that will fit in a single CTCH Block Set. Assuming a setting equal to 19, one CTCH Block Set fits in one Transmission Time Interval (TTI) of 10 msec (mtti=1), which means that it has to contain:
TB size of FACH for CTCH—168 bits
MAC PDU size—160 bits
RLC UMD payload size—152 bits=19 bytes.

BMcompEntryByteCnt defines a maximum number of bytes occupied by a single entry of BMcomp, which is associated with a single CTCH BS of the scheduled CB message. The entry includes the Message Description entry and, optionally, Schedule Message extension entry when Serial Numbers in the Schedule Message are supported.

The Message Description entry includes only two IEs; namely, Message Description Type and Message Id which, in one embodiment, occupy three bytes. Offset to CTCH BS index of first transmission is not used in embodiments where repetition of the CBS message within the schedule period is not supported (typically will not be considered because it is only 1 byte while Message Id is 2 bytes).

The Schedule Message extension entry will take less than one byte if one page per message is assumed. Each message will require maximum two IEs; namely, Serial Number (2 bytes) and CTCH BS Index (1 byte). Future Extension bitmap, Length of Serial Number List may add an additional byte. The impact is negligible when multiple messages are broadcasted. Assuming the worst scenario of one message per page, the message will therefore occupy 83/19=4.5 CTCH BS, since there are 83 bytes per page (the header is included). Therefore three bytes will be added for each 4.4 CTCH BS, which means that for a single CTCH BS the size of Schedule message extension will be 3/4.5CTCH BS<0.71 bytes for a single CTCH BS. That is, the size of BMcompEntryByteCnt will be three bytes and less than four bytes when the inclusion of Serial Numbers in the Schedule Message is supported. Because not every message will be just of a single page, and there would be multiple CB messages, in some embodiments it is assumed that BMcompEntryByteCnt=3.5.

BMctchCount defines an approximate number of CTCH blocks sets occupied by CB messages in DRX period n+1 for each CTCH Block Set occupied by BMcomp(n), such as in conformance with the following equation:

RLCpayloadSize=BMctchCount/8+ BMcompEntryByteCnt*BMctchCount

If RLCpayloadSize=19, and BMctchCount=5, then for each five CTCH Block Sets occupied by the CB Messages transmitted in the DRX schedule period n+1 the BMcomp(n) increases by one CTCH Block Set.

SBMcount(n) defines a Scheduled Broadcast Message Count indicating the number of CTCH Block Sets occupied by the CB messages broadcasted in the DRX schedule period n.

BMcompLen(n) defines a number of CTCH Block Sets occupied by the component BMcomp(n).

If there are no broadcast messages that should be sent in the period n+1, then BMcompLen(n)=0; otherwise length will depend on the SBMcount(n+1), such as in conformance with the following equation:

BMcompLen(n)=SBMcount(n+1)/BMctchCount

SMcompLen(n) defines a number of CTCH Block Sets occupied by the SMcomp component in DRX period n.

SMlen(n) defines a number of CTCH Block Sets occupied by the Scheduling Message in DRX period n, such as in conformance with the following equation:

SMlen(n)=BMCompLen(n)+SMcompLen(n)

DRX schedule period (or DRXsize) defines a maximum number of CTCH BS that can be transmitted in a single CBS Schedule Period.

FIG. 2 graphically depicts information transmitted during each of a plurality of schedule periods according to an embodiment. Specifically, the graphical depiction 200 includes first schedule period information 210, second schedule period information 220 and third schedule period information 230.

The first schedule period information 210 comprises a SM portion 212, an unused portion 216 and a CBS portion 218. It is noted that a new message 240 to be transmitted to the UE is received during the first schedule period. As previously described, the SM 212 includes information pointing to or indicative of the starting block associated with the SM and CBS of the next or second schedule period.

The second schedule period information 220 comprises a SM portion 222 including a further SM portion reserved space or allocation 224, an unused portion 226 and a CBS portion 228. It is noted that the further SM portion allocation 224 comes from the unused portion 226, thereby reducing the size of the unused portion 226 as compared to the unused portion 216 of the first schedule period information 210. The size associated with the SM 222 of the second schedule period may be equal to or greater than the size associated with the SM 212 of the first schedule period to accommodate the scheduling information associated with the new message 240 received during the first scheduling period. The schedule information is adapted to indicate to the UE the portion of the third schedule period that will include the new message.

The third schedule period information 230 comprises a SM portion 232, an unused portion 236 and a CBS portion 238. It is noted that the CBS portion 238 also includes the new message 240.

In the various embodiments contemplated by the graphical representation of FIG. 2, a starting point of the SM is the beginning of a DRX period and may be defined as SFN=(K+ mPN). It is noted that beginning of each SM is a fixed distance apart from the beginning of the next SM. Further, the SM size may be made smaller initially and dynamically expanded or contracted as necessary.

Figure 3:
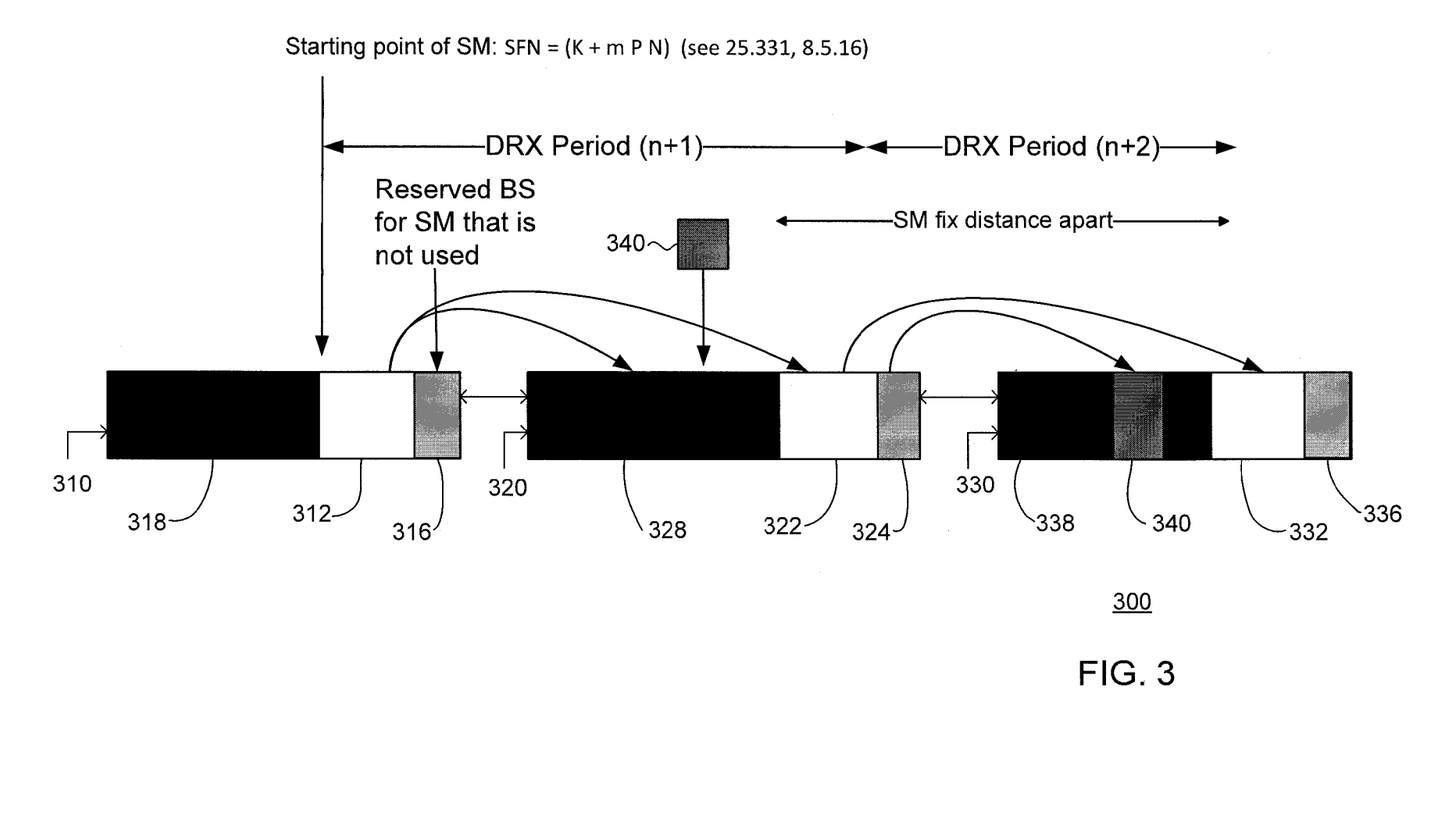
FIG. 3 graphically depicts information transmitted during schedule periods according to one embodiment.

FIG. 3 graphically depicts information transmitted during each of a plurality of schedule periods according to an embodiment. Specifically, the graphical depiction 300 includes first schedule period information 310, second schedule period information 320 and third schedule period information 330. In the various embodiments contemplated by the graphical representation of FIG. 3, a variable length CBS portion precedes a SM portion in the schedule period information. It is noted that the DRX period is still defined by the start of the SM portion of his schedule period.

The first schedule period information 310 comprises a CBS portion 318 followed by an SM portion 312 and an unused portion 316. The unused portion 316 comprises reserved blocks for the SM that are not used during the current schedule period.

The second schedule period information 320 comprises a CBS portion 328 followed by an SM portion 322 including a further SM portion allocation 324. It is noted that a new message 340 to the transmitted to the UE is received during the second schedule period.

The third schedule period information 330 comprises a CBS portion 338 followed by an SM portion 332 and an unused portion 336. It is noted that the CBS portion 338 includes the new message 340 received during the second schedule period.

In the various embodiments contemplated by the graphical representation of FIG. 3, a starting point of the SM is the beginning of a DRX period and may be defined as SFN=(K+ mPN). It is noted that beginning of each SM is a fixed distance apart from the beginning of the next SM. However, since the SM size may be made smaller initially and dynamically expanded or contracted as necessary, the parameter Offset to Begin CTCH BS Index is variable in these embodiments. In addition, the CBS is of variable length or size, and is transmitted prior to the SM. It is also noted that a time interval of, illustratively, greater than 100 ms exists between the end of the unused blocks of one time period and the beginning of the CBS portion of the next time period. Time periods that are smaller or larger may be used for this purpose, though it is noted that the 3GPP standards require a 100 ms minimum.

Figure 4:
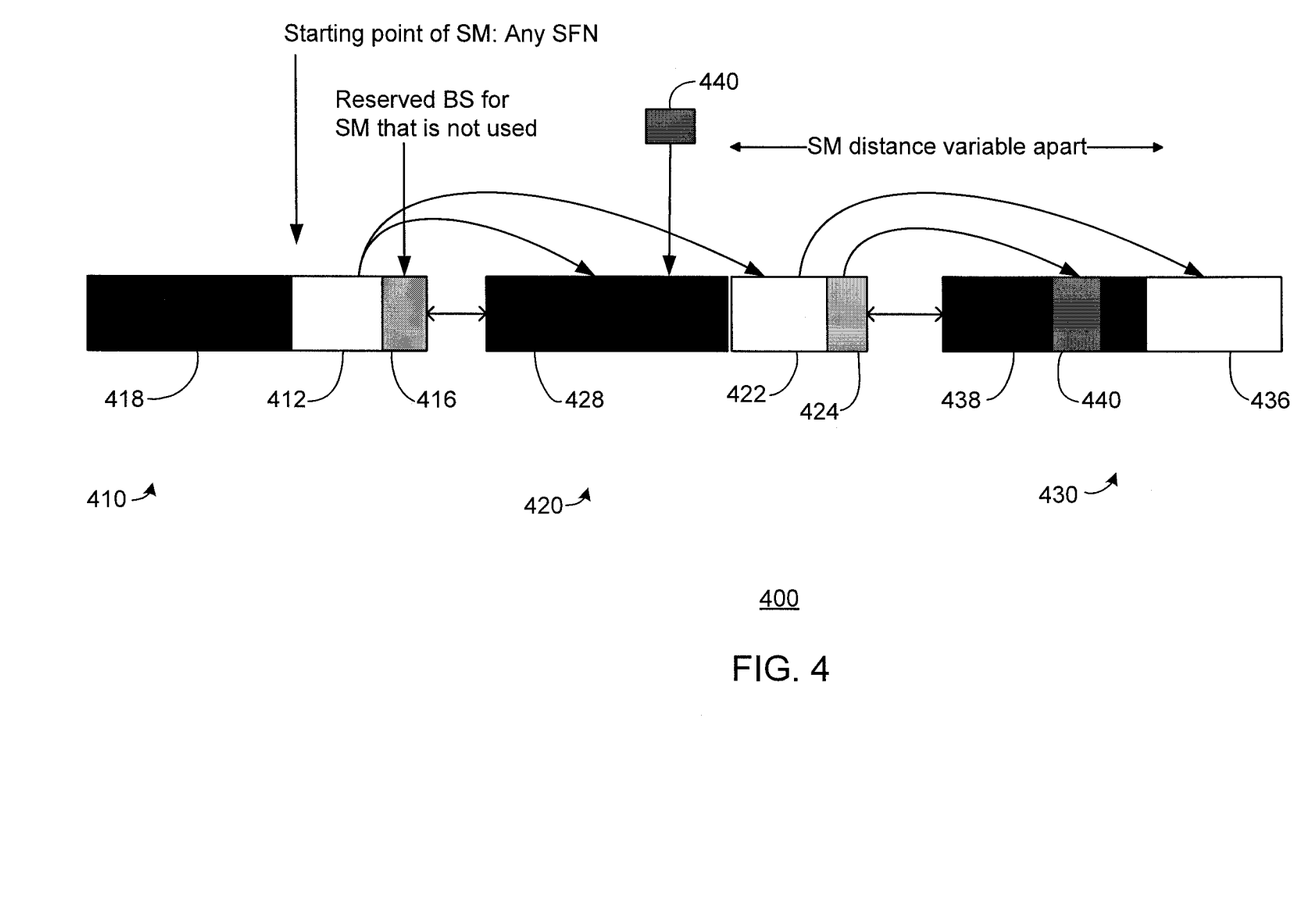
FIG. 4 graphically depicts information transmitted during schedule periods according to another embodiment.

FIG. 4 graphically depicts information transmitted during each of a plurality of schedule periods according to an embodiment. Specifically, the graphical depiction 400 includes first schedule period information 410, second schedule period information 420 and third schedule period information 430. In the various embodiments contemplated by the graphical representation of FIG. 4, a variable length CBS portion precedes a SM portion in the schedule period information. It is noted that the DRX period is still defined by the start of the SM portion of his schedule period.

The first schedule period information 410 comprises a CBS portion 418 followed by an SM portion 412 and an unused portion 416. The unused portion 416 comprises reserved blocks for the SM that are not used during the current schedule period.

The second schedule period information 420 comprises a CBS portion 428 followed by an SM portion 422 including a further SM portion allocation 424. It is noted that a new message 440 to be transmitted to the UE is received during the second schedule period.

The third schedule period information 430 comprises a CBS portion 438 followed by an SM portion 432 and an unused portion 436. It is noted that the CBS portion 438 includes the new message 440 received during the second schedule period.

In the various embodiments contemplated by the graphical representation of FIG. 4, a starting point of the SM is the beginning of a DRX period and may be any SFN and, unlike the graphical representation of FIG. 3, the beginning of each SM is a variable distance apart from the beginning of the next SM. However, since the SM size may be made smaller initially and dynamically expanded or contracted as necessary, the parameter Offset to Begin CTCH BS Index is variable in these embodiments. In addition, the CBS is a variable length as well as transmitted prior to the SM. It is also noted that a time interval of, illustratively, greater than 100 ms exists between the end of the unused blocks of one time period and the beginning of the CBS portion of the next time period.

Figure 5:
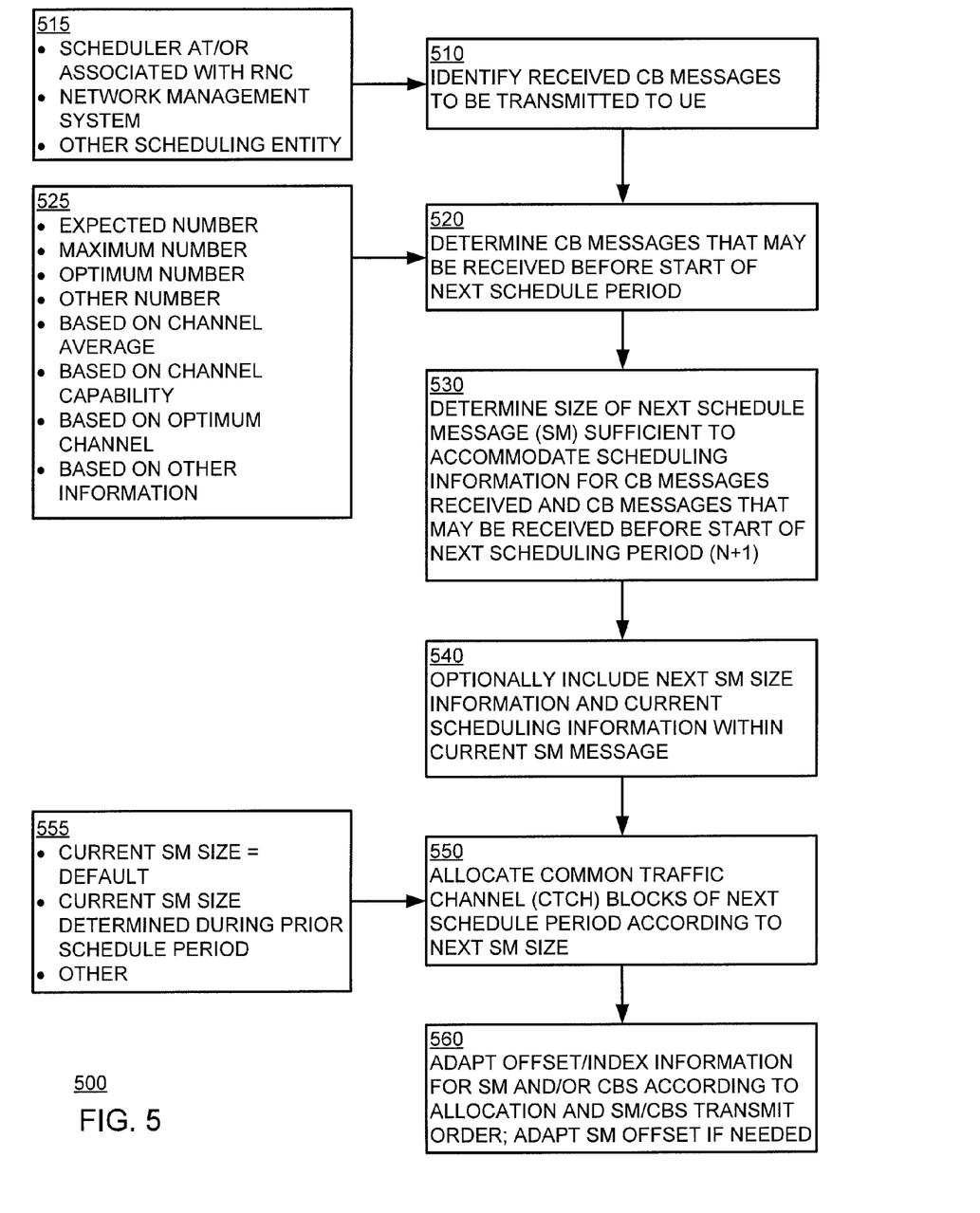

FIG. 5 depicts a flow diagram of a method according to an embodiment. Specifically, FIG. 5 depicts a method 500 for scheduling discontinuous cell block (CB) data transfers to a UE. In particular, the method 500 operates during a current schedule period (n) to determine a size of a schedule message (SM) associated with a next schedule period (n+1) to schedule CB messages already received as well as CB messages that may be received prior to the start of the next schedule period (n+1). In this manner, when the next schedule period (n+1) begins, substantially all of the CB messages received in the current schedule period (n) will be scheduled for transmission to the UE in the schedule period (n+2) following the next schedule period (n+1). It is noted that if the SM is at the end of the schedule period (n+1), then new CB message may overlap with the beginning of period (n+1) and yet still be transmitted at period (n+2).

At step 510, CB messages received and ready to be transmitted to a UE are identified. Referring to box 515, this identification may be made via a schedule at or associated with a RNC, via a network management system (NMS) or via some other scheduling entity.

At step 520, a determination is made of a number of CB messages that may be received before the start of the next schedule period. Referring to box 525, the CB messages that may be received may comprise an expected number of messages, a maximum number of messages, an optimal number of messages or some other number of messages.

The number of messages may be based upon the bandwidth, data rate or message rate associated with the channel providing messages as well as the amount of time remaining in the current channel period within which messages may be received. Referring again to box 525, the bandwidth, data rate or message rate associated with the channel may be based upon a channel average, a channel capability, and optimum channel utilization or some other information. The number of messages may be based upon a statistical analysis of the message or data flow such as an extrapolation based upon the expected arrival rate of some number of CB messages along with CB message size information.

In various embodiments, an expected number of CB messages is determined according to a core network throughput capacity, such as the capacity of a channel providing data to UE supported by the base station/eNodeB, a Service Gateway, a Packet Gateway and/or various routing elements within the network. Information defining core network throughput capacity associated with a UE channel may be received directly from a network management system (NMS), element management system (EMS), routing element, base station/eNodeB or other network element. This information may also be determined by monitoring one or more UE channel throughput indicators over time and statistically representing or modeling channel traffic or channel capability, such as instantaneous capability, average capability, rolling average capability, time of day capability and so on. Monitored UE channel throughput indicators may comprise performance, congestion, management data or alarms associated with various network elements supporting the appropriate UE channel(s).

At step 530, a determination is made of a size of a next schedule message (SM) sufficient to accommodate scheduling information for CB messages already received as well as CB messages that may be received before the start of the next schedule period. That is, the size of a next schedule message must be sufficient to include schedule information associated with the CB messages received already as well as CB messages that may be received prior to the start of the next schedule period.

At step 540, schedule message size information determined at step 530 is optionally included within a current schedule message via one or more data fields within the SM header or payload.

Generally speaking, this explicit inclusion of message size information is unnecessary; rather, the SM structure includes index and offset information which is used by a receiver to identify the SM portion, CB portion and or other portions of the schedule period. In particular, there exists a SM size parameter and a message size parameter (which includes SM, CB and so on). The receiver may determine SM size by reading the Message Description that is associated with a Message Bit Map. The Message Description indicates whether each block is a CB, SM or something else.

With respect to message size, the index and offset define the period and, particularly, which broadcast schedule within that period is actually defined by the Message Bit Map and its corresponding Message Description. A Message Description may simply indicate that there is no message for its corresponding BS.

At step 550, common traffic channel (CTCH) blocks within a next schedule period are allocated according to the determined size parameter associated with a next schedule message. Referring to box 555, the size of a current schedule message may comprise a default size (e.g., 40 CTCH blocks) or a size determined during a prior schedule period.

At step 560, offset/index information within the SM structure is adapted to indicate directly or indirectly the locations within a service period containing the SM, the CB messages, and/or other data elements. In particular, the offset/index information is adapted to reflect the type of embodiment employed, the transmission order (SM before CBS or CBS before SM) and/or other parameters. As previously noted, such offset/index information may be associated with Offset to Begin CTCH BS Index, Length of CBS Scheduling Period and/or other SM structural elements or fields.

CB messages received by the RNC in DRX period n, the corresponding scheduling information is transmitted to the receiver in SMn+1 within DRX period n+1, and the CB messages and cells are transmitted to the receiver for that schedule in DRX period n+2.

The SM includes information pointed to or otherwise identifying the start of the SM of a next scheduling period, the CB messages of the next scheduling period and/or the next cell broadcast schedule (CBS) period. For example, a SM may point to, illustratively, the CTCH block associated with the start of the next SM in the next schedule period. Each SM is adapted by a prior SM, where the annotation imparted to the SM is based on the CB messages received for the prior SM is transmitted (i.e., before the beginning of the current DRX schedule period).

Various embodiments employing variable or dynamic allocations of CTCH blocks for the SM and/or CB messages may also adapt and offset parameter to ensure that a fixed time interval between adjacent SM does maintained (i.e., the size or time associated with a DRX schedule period is maintained).

Thus, in some embodiments, step 560 further includes adapting index/offset information to ensure that an appropriate (e.g. predetermined or fixed) interval between successive scheduling messages is maintained.

The embodiments described herein with respect to the various figures contemplate a sequence of scheduling periods during which a scheduling message (SM) and one or more CB messages (if any) are transmitted to a UE. Generally speaking, a CB message received during a current or first schedule period n is scheduled for transmission to the UE via a SM transmitted to the UE during a next or second schedule period n+1 and actually transmitted to the UE during a subsequent or third schedule period n+2.

Since the schedule operation takes a finite amount of time, CB messages received during the current or first schedule period n may be missed by the scheduler and only processed during the next or second schedule period. In this case, the missed CB messages are scheduled for transmission to the UE via a SM transmitted to the UE during the subsequent or third schedule period n+2 and actually transmitted to the UE during a fourth schedule period n+3.

The various embodiments operate to reserve sufficient scheduling message space for CB messages that might otherwise be missed, thereby improving throughput and reducing latency with respect to UE data.

In various embodiments, the SM associated with a DRX schedule period is transmitted during an initial or "front" portion of a cell broadcast schedule (CBS) period. That is, the SM of a scheduling period n is transmitted prior to the CB. In various other embodiments, the SM associated with a DRX schedule period is transmitted during an final or "back" portion of a cell broadcast schedule (CBS) period. These various embodiments are discussed above with respect to the various figures, and graphically illustrated in FIGS. 2-4.

Figure 6:
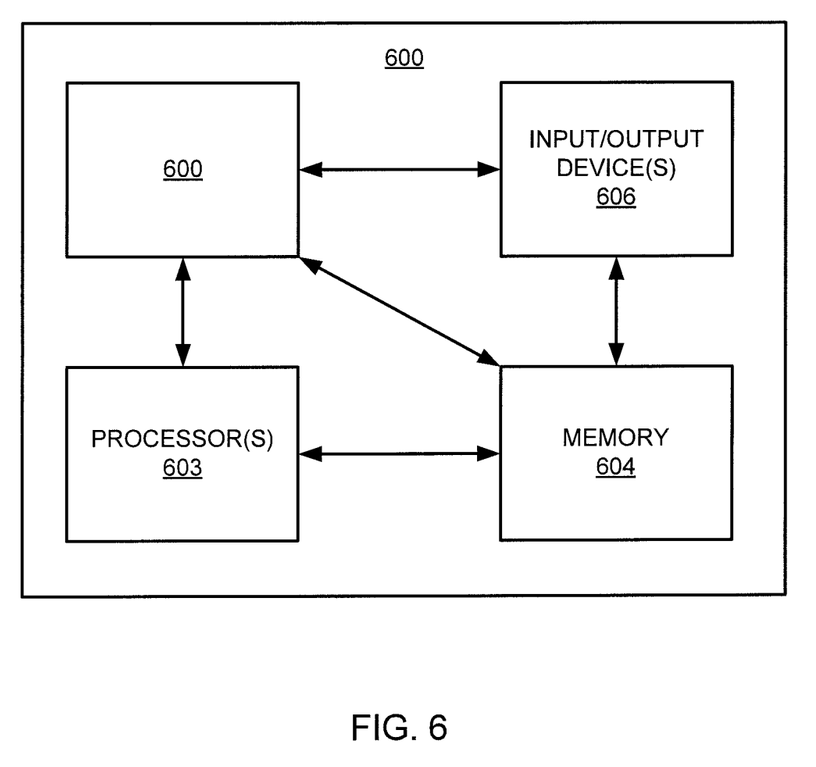
FIG. 6 depicts a flow diagram of methods according to various embodiments.

FIG. 6 depicts a high-level block diagram of a computer suitable for use in performing functions described herein.

As depicted in FIG. 6, computer 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for scheduling transmission of cell broadcast (CB) messages to user equipment (UE) from a radio network controller (RNC), comprising:
   transmitting toward a UE a scheduling message (SM) and any scheduled cell broadcast (CB) messages during each (n) of a plurality of discontinuous reception (DRX) schedule periods, wherein the SM includes scheduling information for CB messages to be transmitted to the UE during a subsequent DRX schedule period;
   said SM being adapted to have a size sufficient to contain scheduling information for an expected number of CB messages including CB messages already received and to be received by the RNC prior to a current DRX schedule period.

2. The method of claim 1, wherein said expected number of CB messages is determined according to an optimal bandwidth of a channel delivering CB messages to the RNC.

3. The method of claim 1, wherein said expected number of CB messages is determined according to a core network throughput capacity.

4. The method of claim 3, wherein said core network throughput capacity is provided by one of a network management system (NMS) and element management system (EMS) associated with a network element supporting a communications channel to the UE.

5. The method of claim 3, wherein said core network throughput capacity is empirically determined by monitoring one or more UE channel throughput indicators.

6. The method of claim 5, wherein said UE channel throughput indicators comprise any performance, congestion, or management data or alarms associated with a network element supporting the UE channel.

7. The method of claim 1, wherein said expected number of CB messages is determined according to at least one of an expected CB message arrival rate and CB message size.

8. The method of claim 1, wherein said expected number of CB messages comprises a maximum number of CB messages capable of being transmitted via the UE channel.

9. The method of claim 1, wherein said SM comprises a first allocation of common traffic channel (CTCH) block sets containing scheduling information associated with received CB messages and a second allocation of CTCH block sets containing scheduling information associated with one of an expected number and a maximum number of CB messages.

10. The method of claim 1, wherein said SM size is adapted to include a reserved space for storing scheduling information for expected but not yet received CB messages.

11. The method of claim 1, wherein a SM is transmitted during an initial portion of a cell broadcast schedule (CBS) period.

12. The method of claim 1, wherein a SM is transmitted during a final portion of a cell broadcast schedule (CBS) period.

13. The method of claim 1, wherein any CB messages are transmitted during an initial portion of a cell broadcast schedule (CBS) period.

14. The method of claim 1, wherein any CB messages are transmitted during an initial portion of a cell broadcast schedule (CBS) period.

15. The method of claim 1, wherein a current DRX schedule period SM (n) includes explicit size information associated with a next DRX schedule period SM (n+1).

16. The method of claim 1, wherein said UE and RNC operate within one of a UMTS network and a LTE network.

17. An apparatus for scheduling transmission of cell broadcast (CB) messages to user equipment (UE) from a radio network controller (RNC), the apparatus comprising:
a processor configured for:
transmitting toward a UE a scheduling message (SM) and any scheduled cell broadcast (CB) messages during each (n) of a plurality of discontinuous reception (DRX) schedule periods, wherein the SM includes scheduling information for CB messages to be transmitted to the UE during a subsequent DRX schedule period;
said SM being adapted to have a size sufficient to contain scheduling information for an expected number of CB messages including CB messages already received and to be received by the RNC prior to a current DRX schedule period.

18. The apparatus of claim 17, wherein said apparatus is associated with any of a client device, a base station, a router and a node within a Wireless Service Provider (WSP) access network.

19. A non-transitory computer readable storage medium storing instructions which, when executed by a computer, cause the computer to perform a method for scheduling transmission of cell broadcast (CB) messages to user equipment (UE) from a radio network controller (RNC), comprising:
transmitting toward a UE a scheduling message (SM) and any scheduled cell broadcast (CB) messages during each (n) of a plurality of discontinuous reception (DRX) schedule periods, wherein the SM includes scheduling information for CB messages to be transmitted to the UE during a subsequent DRX schedule period;
said SM being adapted to have a size sufficient to contain scheduling information for an expected number of CB messages including CB messages already received and to be received by the RNC prior to a current DRX schedule period.

20. A non-transitory computer program product wherein computer instructions, when processed by a computer, adapt the operation of the computer to provide a method for scheduling transmission of cell broadcast (CB) messages to user equipment (UE) from a radio network controller (RNC), comprising:
transmitting toward a UE a scheduling message (SM) and any scheduled cell broadcast (CB) messages during each (n) of a plurality of discontinuous reception (DRX) schedule periods, wherein the SM includes scheduling information for CB messages to be transmitted to the UE during a subsequent DRX schedule period;
said SM being adapted to have a size sufficient to contain scheduling information for an expected number of CB messages including CB messages already received and to be received by the RNC prior to a current DRX schedule period.

* * * * *